US008649703B2

(12) United States Patent
Yamazaki

(10) Patent No.: US 8,649,703 B2
(45) Date of Patent: Feb. 11, 2014

(54) IMAGE FORMATION APPARATUS HAVING FIRST AND SECOND EXTERIOR COVERS

(75) Inventor: Masato Yamazaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 190 days.

(21) Appl. No.: 13/222,032

(22) Filed: Aug. 31, 2011

(65) Prior Publication Data

US 2012/0057285 A1  Mar. 8, 2012

(30) Foreign Application Priority Data

Sep. 3, 2010  (JP) .................................. 2010-197620

(51) Int. Cl.
*G03G 15/00* (2006.01)

(52) U.S. Cl.
USPC .......................................... 399/107; 399/118

(58) Field of Classification Search
USPC ........................... 399/118, 107; 361/730–733;
174/559–563; 358/300; 347/152, 263
See application file for complete search history.

(56) References Cited

U.S. PATENT DOCUMENTS

| 7,463,842 B2 * | 12/2008 | Imada et al. ..................... 399/92 |
| 8,010,016 B2 * | 8/2011 | Kurotsu et al. ............... 399/118 |
| 8,068,754 B2 * | 11/2011 | Kubochi et al. ................. 399/60 |

FOREIGN PATENT DOCUMENTS

| JP |   10136133 A | * | 5/1998 |
| JP | 2002-023437 A |   | 1/2002 |
| JP | 2005-197592 A |   | 7/2005 |
| JP |   2007271893 A | * | 10/2007 |
| JP |   2008158082 A | * | 7/2008 |
| JP |   2009145823 A | * | 7/2009 |
| JP | 2010-005962 A |   | 1/2010 |

* cited by examiner

*Primary Examiner* — Robert Beatty
(74) *Attorney, Agent, or Firm* — Marvin A. Motsenbocker; Mots Law, PLLC

(57) ABSTRACT

An image formation apparatus includes a first unit and a second unit connected with each other, a first exterior cover covering a part of the first unit, a second exterior cover covering a part of the second unit and formed with a cover main body and an extension extending from the cover main body. A third exterior cover is provided between the first exterior cover and the second exterior cover and overlaps with while contacting the extension of the second exterior cover.

15 Claims, 20 Drawing Sheets

IMAGE FORMATION APPARATUS HAVING FIRST AND SECOND EXTERIOR COVERS

CROSS REFERENCE TO RELATED APPLICATIONS

This application claims priority based on 35 USC 119 from prior Japanese Patent Application No. 2010-197620 filed on Sep. 3, 2010, entitled "IMAGE FORMATION APPARATUS," the entire contents of which are incorporated herein by reference.

BACKGROUND OF THE INVENTION

1. Field of the Invention

The invention relates to an image formation apparatus, and to an exterior cover structure thereof.

2. Description of Related Art

In a conventional image formation apparatus, a printer unit and a scanner unit are connected to each other with a rigid arm. An exterior cover of the scanner unit, an exterior cover of the printer unit, and an exterior cover of the rigid arm are independently attached to the units and arms, respectively. For example, see Japanese Patent Application Laid-Open No. 2002-23437 (Page 3 and FIG. 1)).

SUMMARY OF THE INVENTION

In an image formation apparatus, an attachment error may occur since the exterior cover of the scanner unit, the exterior cover of the printer unit, and the exterior cover of the rigid arm are independently attached.

A first aspect of the invention is an image formation apparatus, including: a first unit and a second unit connected with each other, a first exterior cover covering a part of the first unit; a second exterior cover covering a part of the second unit and formed with a cover main body and an extension extending from the cover main body; and a third exterior cover provided between the first exterior cover and the second exterior cover and being overlapped with and in contact with the extension of the second exterior cover.

A second aspect of the invention is an image formation apparatus, including: a first unit and a second unit connected with each other; a second exterior cover covering a part of the second unit and formed with a cover main body and an extension extending from the cover main body; and a third exterior cover covering a part of the first unit and being overlapped with and in contact with the extension of the second exterior cover.

DETAILED DESCRIPTION OF THE EMBODIMENTS

Figure 1:
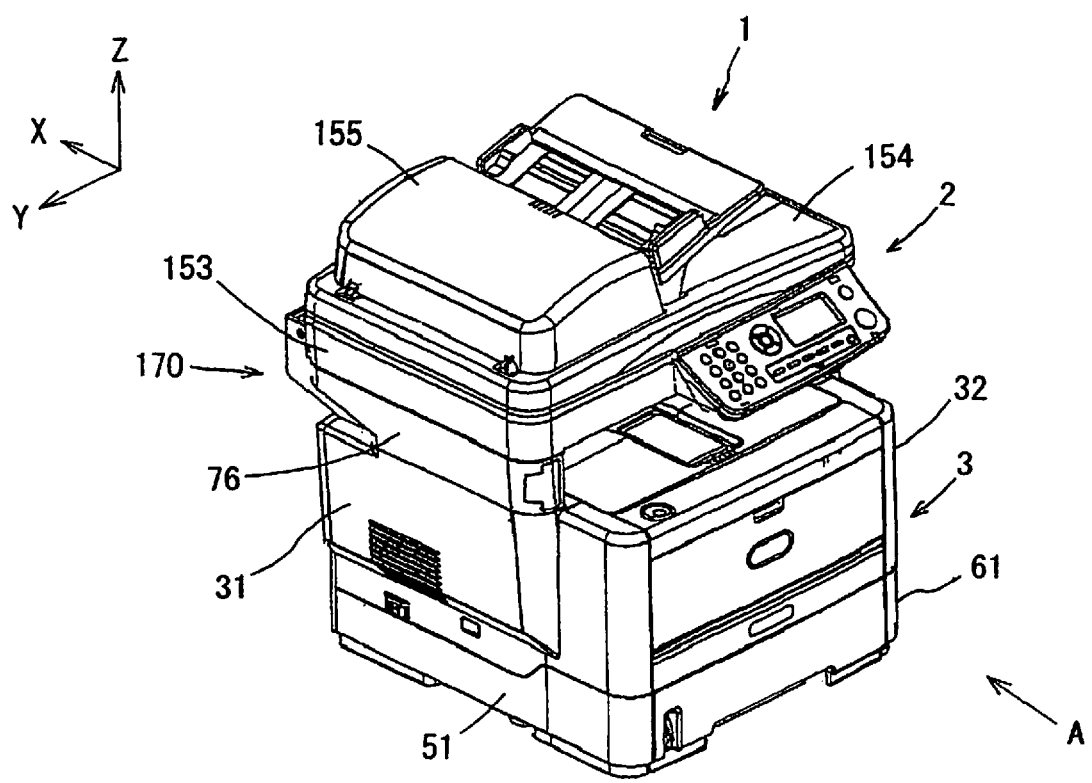
FIG. 1 is a perspective view of an image formation apparatus according to a first embodiment of the invention.

Descriptions are provided below for embodiments based on the drawings. In the respective drawings referenced herein, the same constituents are designated by the same reference numerals and duplicate explanations concerning the same constituents are omitted. The drawings illustrate the respective examples only.

First Embodiment

FIG. 1 is a perspective view of an image formation apparatus according to the first embodiment of the invention. FIG.

2 is a front view of the image formation apparatus, seen along the direction of arrow A in FIG. 1 (seen from the negative side of X-axis).

Figure 2:
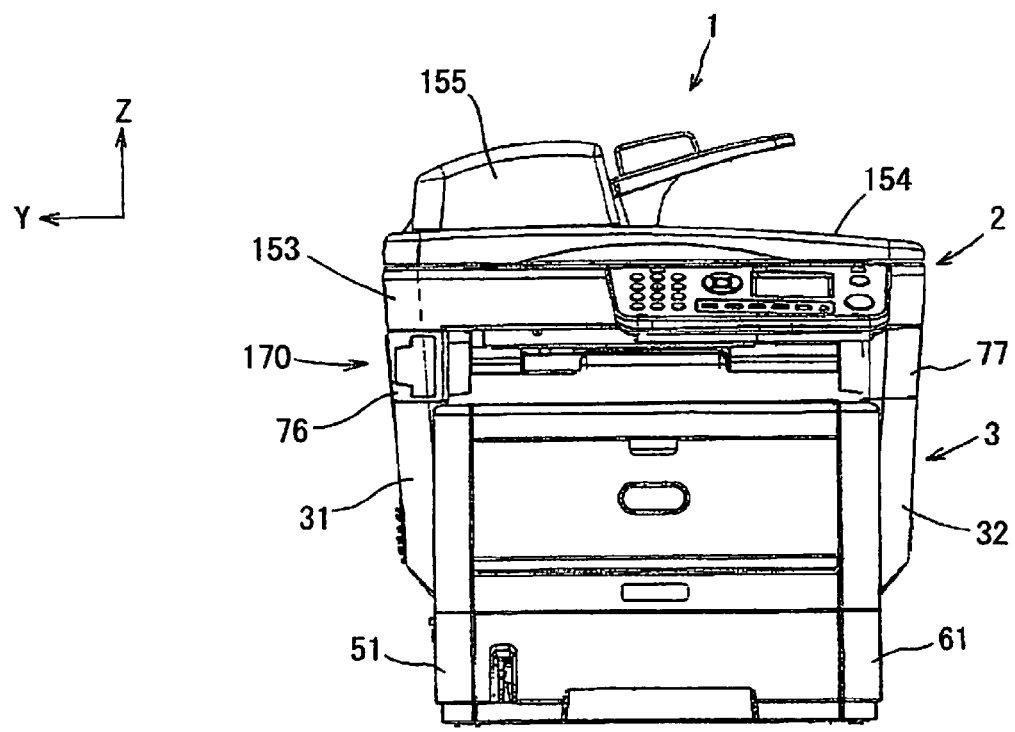
FIG. 2 is a front view of the image formation apparatus as seen along the direction of arrow A in FIG. 1.

As shown in FIGS. 1 and 2, image formation apparatus 1 includes printer 3, serving as an image printing apparatus, and scanner 2, serving as an image scanning apparatus, provided above printer 3.

Figure 3:
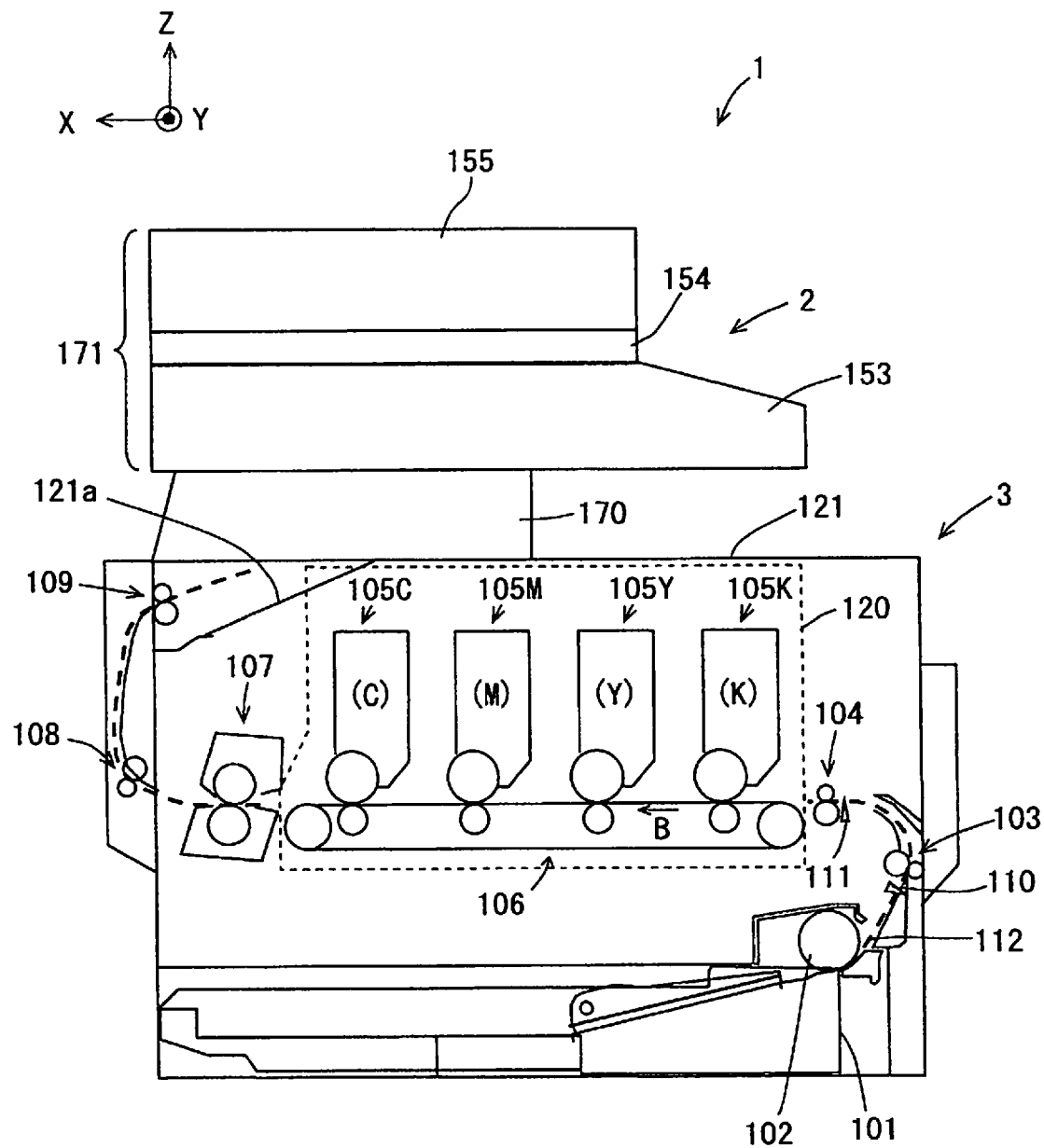
FIG. 3 is a configuration diagram of the image formation apparatus as seen from a side, schematically illustrating a part of the inside configuration of a printer of the image formation apparatus.
Figure 4:
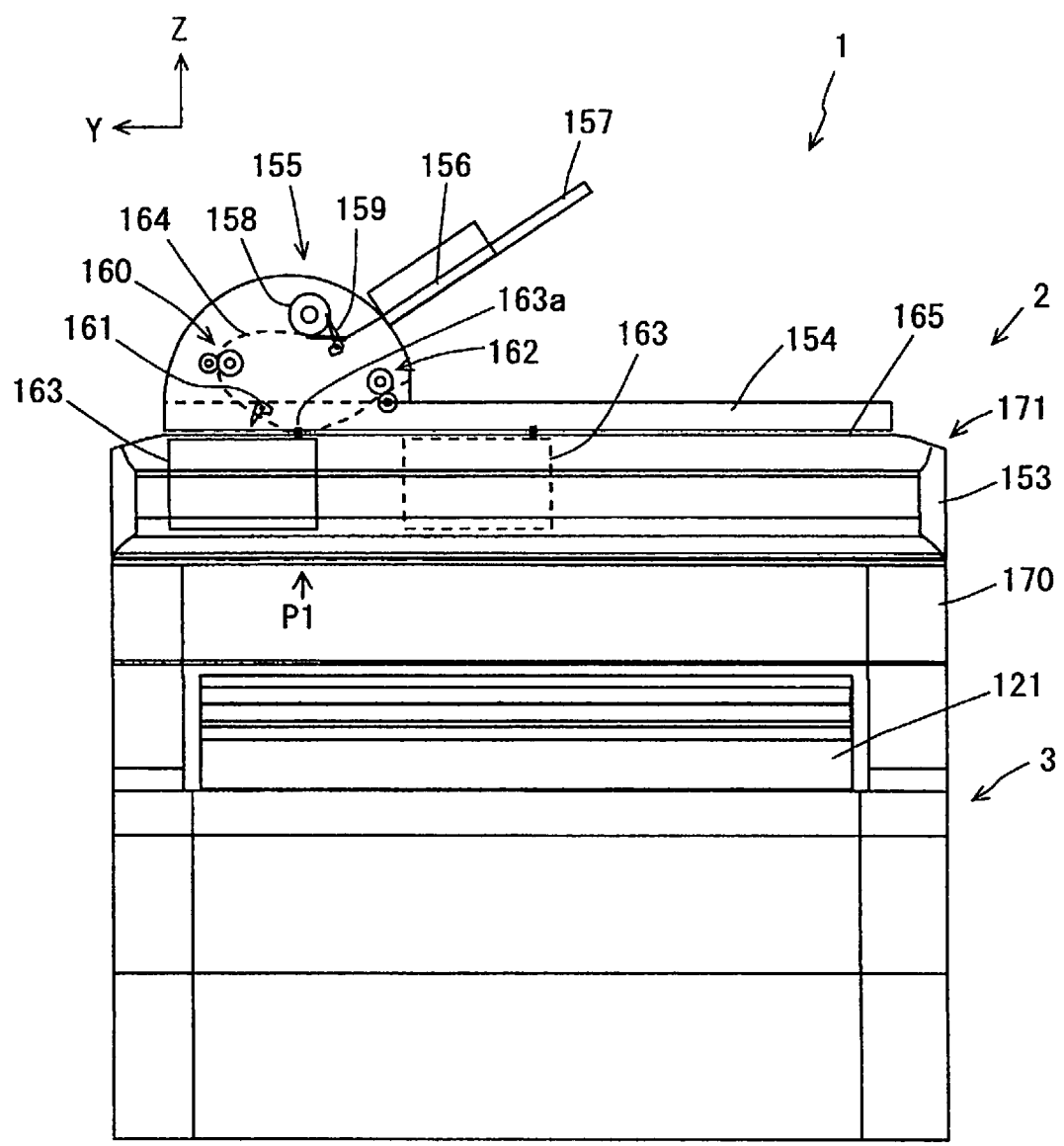
FIG. 4 is a configuration diagram of the image formation apparatus as seen from the front, schematically illustrating a part of the inside configuration of a scanner of the image formation apparatus.

FIG. 3 is a configuration diagram of image formation apparatus 1 as seen from a side (as seen from the positive side of the Y-axis), schematically illustrating a part of the inside configuration of printer 3. FIG. 4 is a configuration diagram of the image formation apparatus as seen from the front side, schematically illustrating a part of the inside configuration of scanner 2.

As shown in FIG. 3, printer 3, serving as a first unit, is equipped with: sheet cassette 101 to accommodate therein recording sheets; feed roller 102 to feed the recording sheets sequentially from sheet cassette 101 along sheet conveyance passage 112 (illustrated by a dotted line); sensors 110 and 111 to detect passage of each recording sheet; conveyance roller pair 103 to convey the recording sheet along conveyance passage 112; resist rollers 104 to convey the recording sheet to print processing unit 120 while correcting skew of the recording sheet by starting rotation thereof at a predetermined timing after sensor 111 detects passage of the recording sheet; print processing unit 120 to execute forming a toner image and transferring of the toner image to the recording sheet; fixation unit 107 including a heat roller and a pressure roller and configured to fix the toner image that has been transferred to the recording sheet by print processing unit 120 to the recording sheet; discharge roller pairs 108 and 109 to discharge the recording sheet that has the toner image fixed thereon out of printer 3; and printer cover unit 121 having stacker 121a for the discharged recording sheets. Printer cover unit 121 is rotatably supported by the main body of printer 3 at an end (left end in FIG. 3) of the main body of printer 3 as described in detail later.

Print processing unit 120 includes toner image formation units 105K, 105Y, 105M, and 105C and image transfer unit 106. Toner image formation units 105K, 105Y, 105M, and 105C are configured to form toner images of respective colors of black (K), yellow (Y), magenta (M), and cyan (C). Image transfer unit 106 is configured to subsequently transfer the color toner images formed by toner image formation units 105 onto the recording sheet in the course of the conveyance of the recording sheet in the direction of arrow B such that the color toner images are superimposed.

On the other hand, scanner 2, serving as a second unit, includes: image scanning unit 153 or an image reading unit; canner cover 154 to cover flat bed 165 (FIG. 4) of image scanning unit 153; ADF (Auto Document Feeder) unit 155 to automatically and sequentially feed document sheets using a part of scanner cover 154; and U-shaped base block 170 rotatably supporting these components 153, 154, and 155 integrally, as described below.

As shown in FIG. 4, ADF unit 155 includes: document tray 156 and document sub-tray 157 to which a document that is subject to be scanned is set; document sheet detection sensor 159 to determine if there is any document sheets to be scanned; ADF roller 158 to separate and feed the document sheets one by one; sheet conveyance roller pair 160 to convey the separated document sheet; sheet passage sensor 161 to detect passage of the document sheet; and sheet discharge roller pair 162. Note that, denoted by a dotted line is sheet conveyance path 164 along which document sheets that are subject for scanning are conveyed by ADF roller 158, sheet conveyance roller pair 160, and sheet discharge roller pair 162.

Image scanning unit 153 has image scanning device 163 slideably supported in the Y-axis direction. Upon scanning document sheets that are set in ADF unit 155, image scanning part 63a of image scanning device 163 is positioned at position P1 and scans the document sheets that pass thereby. Image scanning device 163 is also able to scan a document sheet set on flat bed 165. That is, image scanning device 163 scans a document sheet set on flat bed 165 while image scanning device 163 travels along flat bed 165 (see, a dotted line in FIG. 4).

Since image scanning unit 153, scanner cover 154, and ADF unit 155 are integrally rotatably supported by base block 170 as described later, these components (image scanning unit 153, scanner cover 154, and ADF unit 155) may be referred to as rotatable unit 171 of scanner 2.

In FIGS. 1 to 4, the X-axis extends in a direction along which the recording sheet travels when the recording sheet passes through print processing unit 120, the Y-axis extends in a direction of the rotational axis of the rollers such as recording sheet feed roller 102, and the Z-axis extends orthogonal to both of the X-axis and the Y-axis. In the Figures that is to be described later, the axes of X, Y, and Z are denoted in the same directions as in FIGS. 1 to 4. That is, the axes of X, Y, and Z in each figure indicate the orientation of the illustrated parts of image formation apparatus 1 in each figure. In this embodiment, the Z-axis orients substantially in the vertical direction.

Next, operations of the copying process including the printing process and the image scanning process in image formation apparatus 1 will be described with reference to FIGS. 3 and 4.

A copy button (not shown) is pushed by the user after sheets to be scanned are set on document tray 156 and document sub-tray 157 of ADF unit 155. With this, image formation apparatus 1 determines, with document sheet detection sensor 159, whether sheets exist to be scanned. If there is one or more sheets, ADF roller 158 sequentially feeds the sheets to be scanned and then sheet conveyance roller pair 160 conveys the fed sheets. After a predetermined time elapsed from when sheet passage sensor 161 detects passage of the sheet, image scanning device 163 starts to scan the sheet. Then, the scanned sheet is discharged from ADF unit 155 by sheet discharge roller pair 162.

Data of the scanned document sheets are processed by a scanner controller (not shown) as image data and then the image data are transmitted to a controller (not shown) in printer 3. This causes the printing operation to start.

In printer 3, as shown in FIG. 3, feed roller 102 feeds the recording sheets one by one from sheet cassette 101 to sheet conveyance passage 112. The recording sheet that has passed by sensor 110 is conveyed, by conveyance roller pair 103, to resist roller pair 104. After the recording sheet is passed by sensor 111, resist roller pair 104 starts to rotate at the time when the leading end of the recording sheet comes in contact with resist roller pair 104 evenly, thereby correcting skew of the recording sheet and conveying the recording sheet to print processing unit 120.

In print processing unit 120, based on the image data, toner image formation units 105K, 105Y, 105M, and 105C form the toner images of black (K), yellow (Y), magenta (M), and cyan (C), respectively. Image transfer unit 106 transfers, onto the recording sheet, the toner images of the respective colors formed by toner image formation units 105 while conveying the recording sheet in the direction of arrow B, so that the toner images are superimposed. The recording sheet having the transferred toner images thereon is conveyed by image transfer unit 106 to fixation unit 107. Fixation unit 107 heats and presses the transferred toner images thereby fixing the transferred toner images to the recording sheet. Discharge roller pair 108 and 109 discharges, to stacker 121a (FIG. 3) of printer cover unit 121, the recording sheet that has been printed (which is, the recording sheet that has been discharged from fixation unit 107).

Next, the structure and the method of attachment of covers 31 and 32, serving as third exterior covers, according to the image formation apparatus of the first embodiment will be described.

Figure 5:
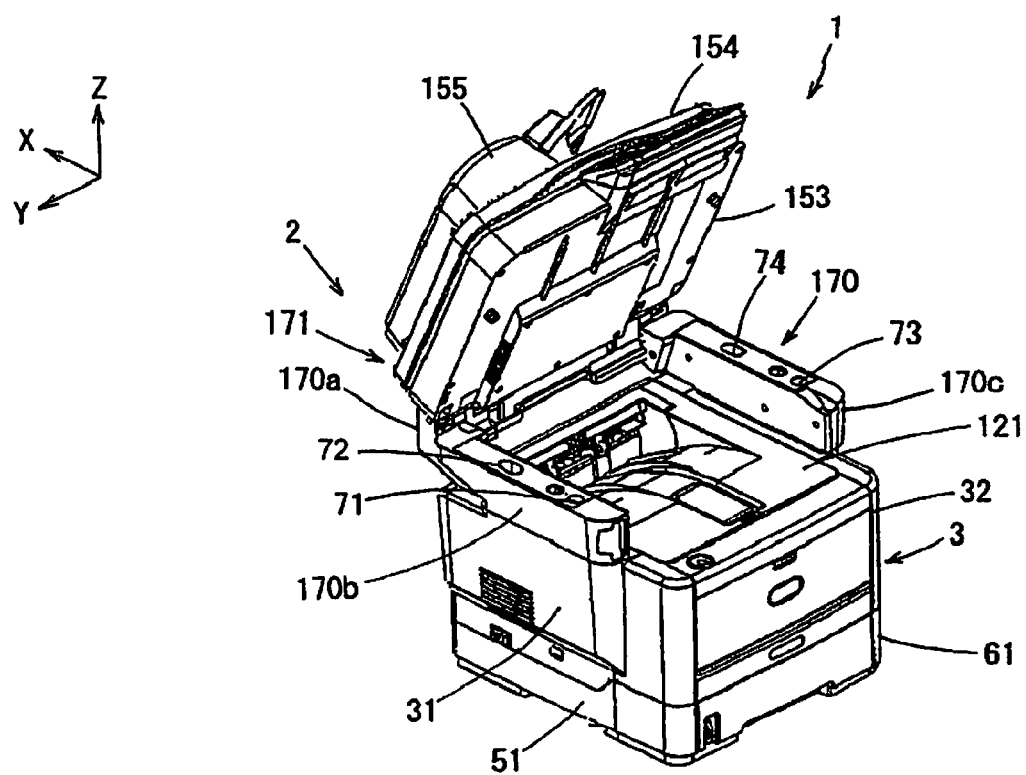
FIG. 5 is a perspective view of the image formation apparatus of the first embodiment, illustrating a state wherein a rotatable unit of the scanner has been rotated to a position opened with respect to a base block of the scanner.
Figure 6:
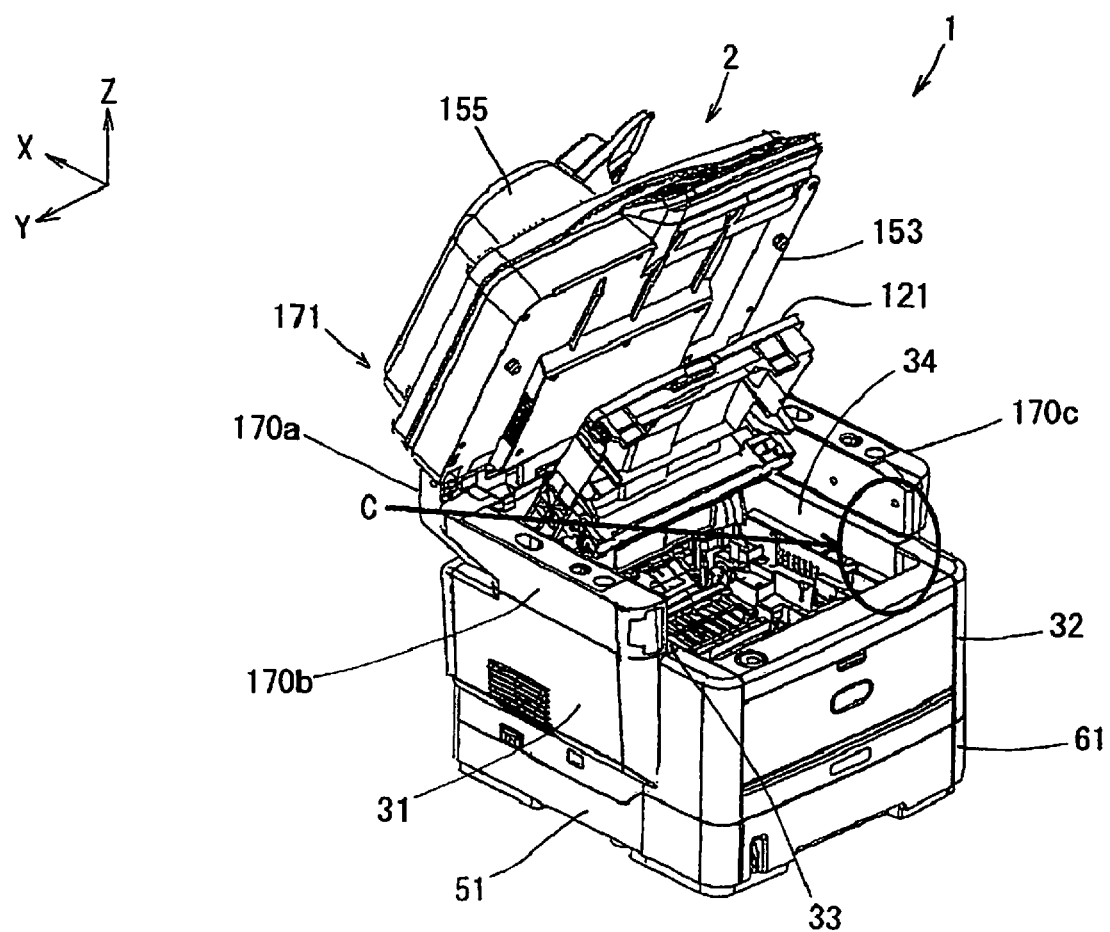
FIG. 6 is a perspective view of the image formation apparatus of the first embodiment, illustrating a state wherein a printer cover unit of the printer has been rotated to a position opened with respect to a main body of the printer.
Figure 7:
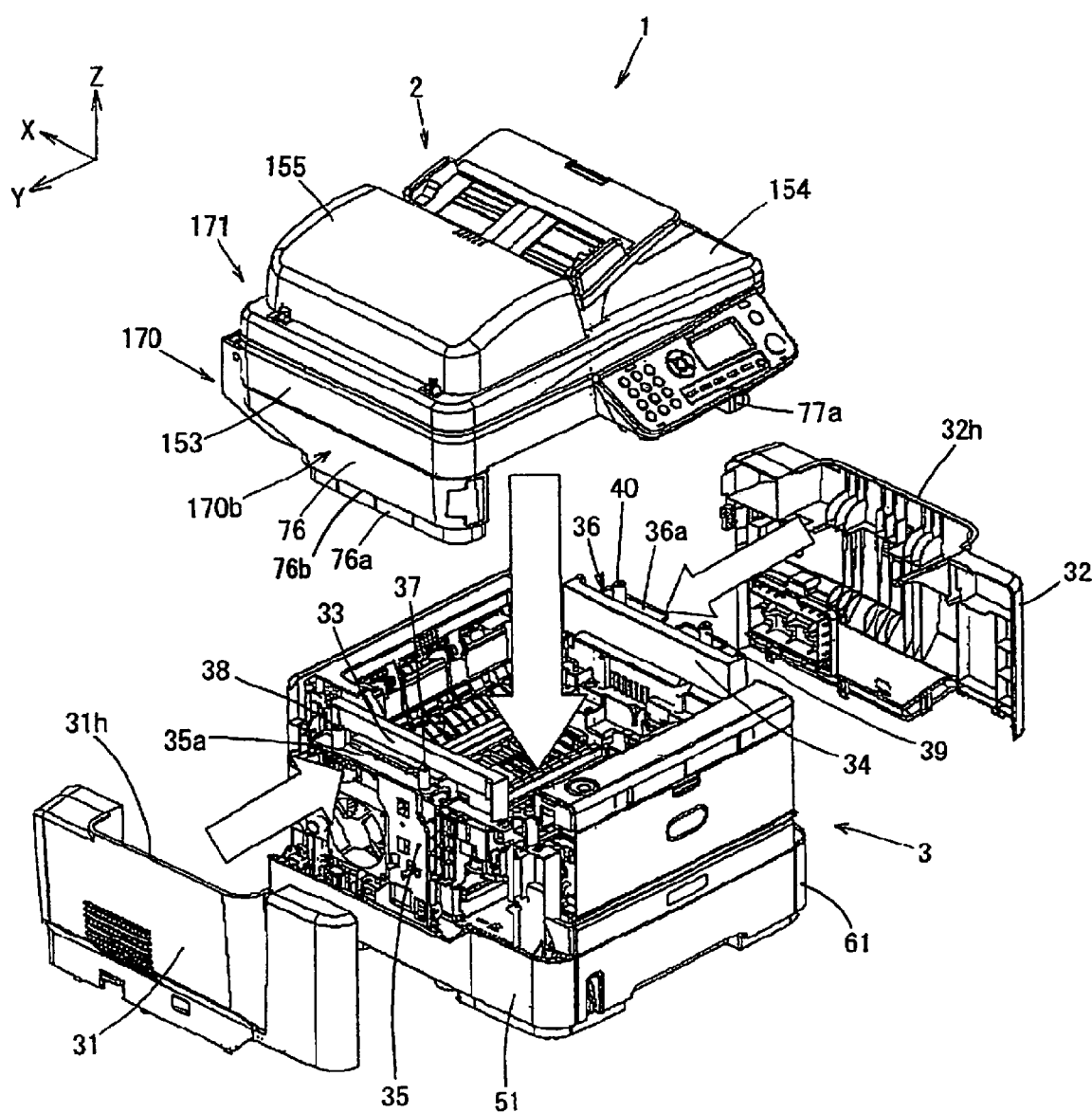
FIG. 7 is an exploded perspective view of the image formation apparatus of the first embodiment, illustrating a state wherein the printer, the scanner, a left cover, and a right cover are separated from each other.

FIG. 5 is a perspective view of the image formation apparatus of the first embodiment, illustrating a state wherein rotatable unit 171 of scanner 2 has been rotated to a position opened with respect to base block 170 of scanner 2. FIG. 6 is a perspective view of the image formation apparatus of the first embodiment, illustrating a state where printer cover unit 121 of printer 3 has been rotated to a position opened with respect to the main body of printer 3. FIG. 7 is an exploded perspective view of the image formation apparatus of the first embodiment, illustrating a state where printer 3, scanner 2, left cover 31, and right cover 32 are separated from each other. Note that printer cover unit 121 is omitted in FIG. 7.

Upon building image formation apparatus 1 by assembling the separated components thereof as shown in FIG. 7, first, scanner 2 is attached to printer 3. Next, the attachment process will described.

As shown in FIG. 7, the left side face of printer 3 is provided with T-shaped left scanner-stay 35 upwardly extending from a lower chassis to the center of the left side face. The right side face of printer 3 is provided with T-shaped right scanner-stay 36 (not shown in FIG. 7) upwardly extending from the lower chassis to the center of the right side face. Left scanner stay 36 is a mirror image of left scanner stay 35. Upper arms 35a and 36a of scanner stays 35 and 36 have a pair of posts 37 and 38 and a pair of posts 39 and 40, respectively, which extend upwardly (in the Z-direction). Posts 37 and 38 as well as posts 39 and 40 are spaced away in the horizontal direction (in the X-axis direction).

On the other hand, as shown in FIG. 5, base block 170 of scanner 2 has a C-shape or an U-shape which includes left arm section 170b, right arm section 170c, and bridge section 170a connecting left arm section 170b and right arm section 170c, each of which are substantially straight. Bridge section 170a of base block 170 rotatably supports rotatable unit 171 of scanner 2. Left arm section 170b and right arm section 170c of base block 170 are fixed to left scanner stay 35 and right scanner stay 36 of printer 3, respectively. That is, left arm section 170b of base block 170 has engagement hole 71 and engagement elongate hole 72, to which post 37 and post 38 (FIG. 7) of left scanner stay 35 of printer 3 are fitted. Right arm section 170c of base block 170 has engagement hole 73 and engagement elongate hole 74, to which post 39 and post 40 (FIG. 7) of right scanner stay 36 of printer 3 are fitted.

The attachment of scanner 2 to printer 3 is executed as below. First, in the state where rotatable unit 171 of scanner 2 is closed (as shown in FIG. 7) or opened (as shown in FIG. 5) with respect to base block 170 of scanner 2, scanner 2 is moved in the arrow direction in FIG. 7 and mounted to printer 3 while scanner 2 and printer 3 are aligned with each other, such that post 37 and post 38 of left scanner stay 35 are respectively inserted and fit into engagement hole 71 and engagement elongate hole 72 of left arm section 170b of base block 170 and post 39 and post 40 of right scanner stay 36 are respectively inserted and fit into engagement hole 73 and engagement elongate hole 74 of right arm section 170c of base block 170. Then, in the state where rotatable unit 171 of scanner 2 is opened with respect to base block 170 of scanner 2 as shown in FIG. 5, base block 170 of scanner 2 is screwed to post 37 to 40. Note that flanges 71a to 74a (see, FIG. 13) which are to be in press-contact with the corresponding posts are formed in engagement holes 71 and 73 and engagement elongate holes 72 and 74, respectively.

Surfaces of base block 170 are covered with exterior covers. Left and right arm sections 170b and 170c of base block 170 are covered by exterior covers 76 and 77 (see, FIG. 2), serving as a second exterior cover. Exterior covers 76 and 77 are respectively formed with left downward extension 76a and right downward extension 77a extending downward from steps 76b and 77b extending inwardly from the lower end thereof. That is, exterior covers 76 and 77 are respectively formed with: cover main bodies; steps 76b and 77b extending inward from the lower ends of the cover main bodies; and downward extensions 76a and 77a extending downward from the inner ends of steps 76b and 77b. Left downward extension 76a and right downward extension 77a are to be covered by left cover 31 and right cover 32, respectively, as described later.

Next, attachment process of left cover 31 and right cover 32 that are separated as shown in FIG. 7 will be described.

As shown in FIG. 7, upper arm 35a of left scanner stay 35 is provided integrally with left stay cover 33, serving as a support member, to fix left cover 31. Upper arm 36a of right scanner stay 36 is provided integrally with right stay cover 34, serving as a support member, to fix right cover 32. Note that left and right stay covers 33 and 34 also function as an interior cover in the printer when printer cover unit 121 is opened as shown in FIG. 6.

Figure 8:
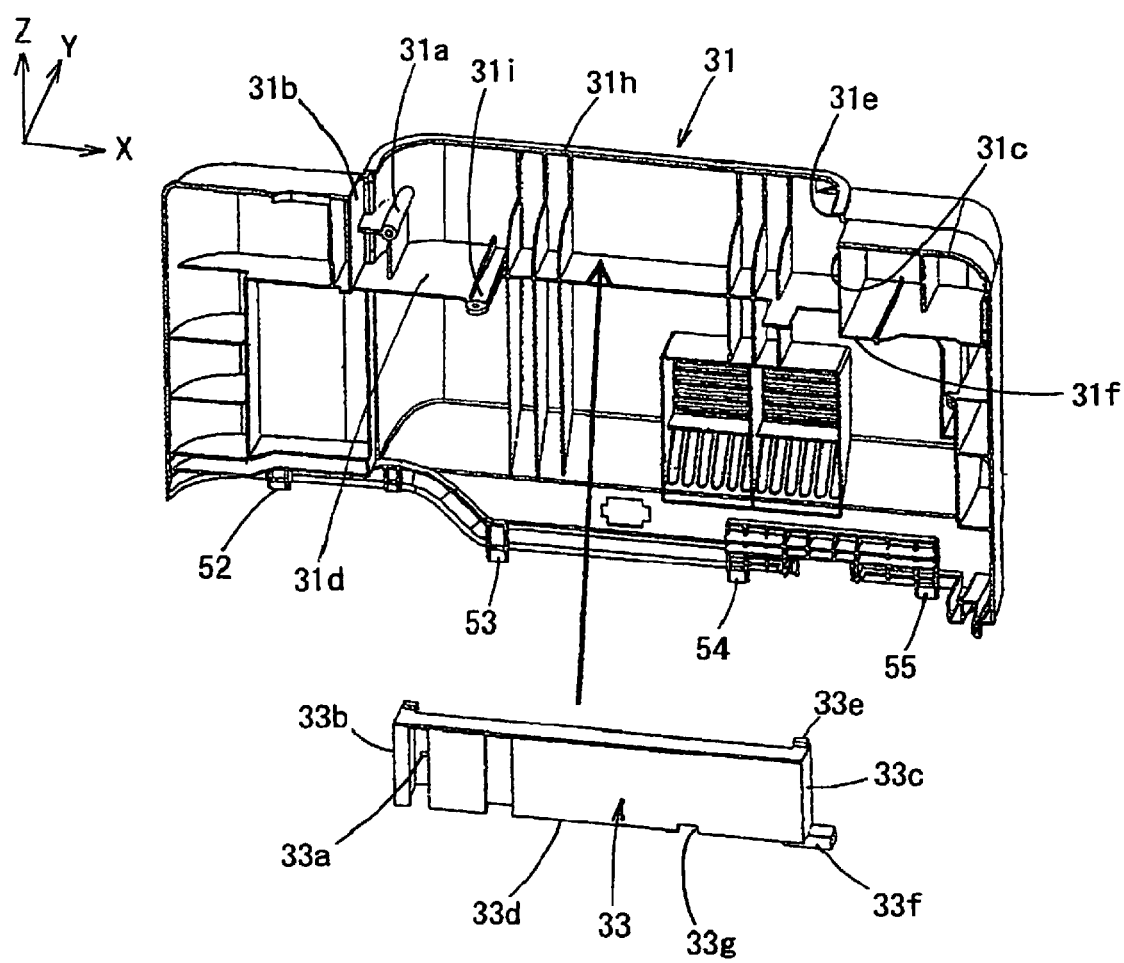
FIG. 8 is an explanatory view for explaining an attachment position of the left cover with respect to a left stay cover according to the first embodiment.
Figure 9:
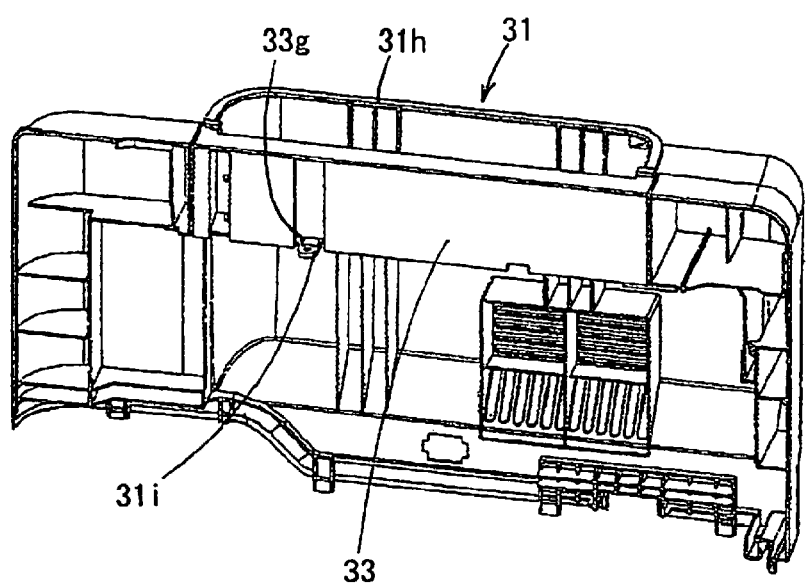
FIG. 9 is an explanatory view illustrating the attachment position of the left cover with respect to the left stay cover according to the first embodiment.

FIGS. 8 and 9 are explanatory views for explaining the attachment position of left cover 31 with respect to left stay cover 33, as seen from the inside of image formation apparatus 1 (as seen from the negative side of the Y-axis). Note that, for descriptive purposes, FIGS. 8 and 9 illustrate left stay cover 33 without left scanner stay 35 and printer 3, which are provided integrally with left stay cover 33. Even through it looks like left stay cover 33 is attached to left cover 31 in FIGS. 8 and 9, left cover 33 is attached to left stay cover 33 since left stay cover 33 is fixed to left scanner stay 35 (FIG. 7) as described above.

As shown in FIG. 8, the inside of left cover 31 (which is, a side of left cover 31 facing left stay cover 33) is formed with post 31a for screw and positioning parts 31b, 31c, 31d, and 31e to position left stay cover 33 in left-and-right, up-and-down, and front-and-rear directions. The lower end of left cover 31 is formed with engagement projections 52 to 55. Engagement projections 52 to 55 are to be engaged with left lower cover 51, serving as the first exterior cover, of printer 3 (FIG. 7) as described later.

On the other hand, left stay cover 33 is formed with side faces 33b and 33c, bottom face 33d, and rear end part 33e. In the state where left stay cover 33 is attached to left cover 31, side faces 33b and 33c are in contact respectively with positioning parts 31b and 31c of left cover 31 while bottom face 33d and rear end part 33e are in contact respectively with positioning parts 31d and 31e of left cover 31. Left stay cover 33 is also formed with threaded hole 33a facing post 31a of left cover 31 and with regulation projection 33f to be engaged with positioning part 31f of left cover 31 thereby regulating the movement of left cover 31.

The attachment of left cover 31 to left stay cover 33 is executed as below. First, as left cover 31 is moved closer to left stay cover 33 as shown in FIG. 7, left cover 31 is positioned such that engagement projections 52 to 55 (FIG. 8)

formed at the lower end of left cover 31 is inserted into the inside of left lower cover 51 of printer 3 so as to prevent the lower end of left cover 31 from moving outwardly.

Note that the lower side of left cover 31 has a shape corresponding to and fitting to the upper side of left lower cover 51 of printer 3. The outline of left cover 31 and the depth from contact surfaces of engagement projections 52 to 55 to the outside surface of left cover 31 are designed so as to flush the outside surface of left cover 31 with the outside surface of left lower cover 51 and so as not to form a gap between the lower side of left cover 31 and the upper side of left lower cover 51 in the state where left cover 31 is positioned as described above.

Next, left cover 31 is moved such that positioning parts 31b, 31c, 31d, and 31e of left cover 31 come respectively in contact with side face 33b, side face 33c, bottom face 33d, and rear end part 33e of left stay cover 33 and so that regulation projection 33f becomes engaged with positioning part 31f. Thereby left cover 31 is prevented from moving with respect to left stay cover 33, as shown in FIG. 9. Next, a screw (not shown) is screwed to post 31a of left cover 31 through threaded hole 33a of left stay cover 33, thereby left cover 31 is fixed to left stay cover 33. This screwing step may be executed from the inside while printer cover unit 121 of printer 3 is opened as shown in FIG. 6, if needed.

Note that, upper side 31h of left cover 31 has a U-shape or a C-shape such that upper side 31h of left cover 31 corresponds to and fits to the outside surface of left downward extension 76a of base block 170. The outline of exterior cover 76, the depth of step 76b of exterior cover 76, and the thickness of upper side 31h of left cover 31 are designed, so as to flush the outside surface of left cover 31 with the outside surface of exterior cover 76 of left arm section 170b of base block 170 and so as not to form a gap between upper side 31h of left cover 31 and step 76b of exterior cover 76, in the state where the inside of left cover 31 is in contact with the outside of left downward extension 76a and left cover 31 is fixed to left stay cover 33.

Figure 10:
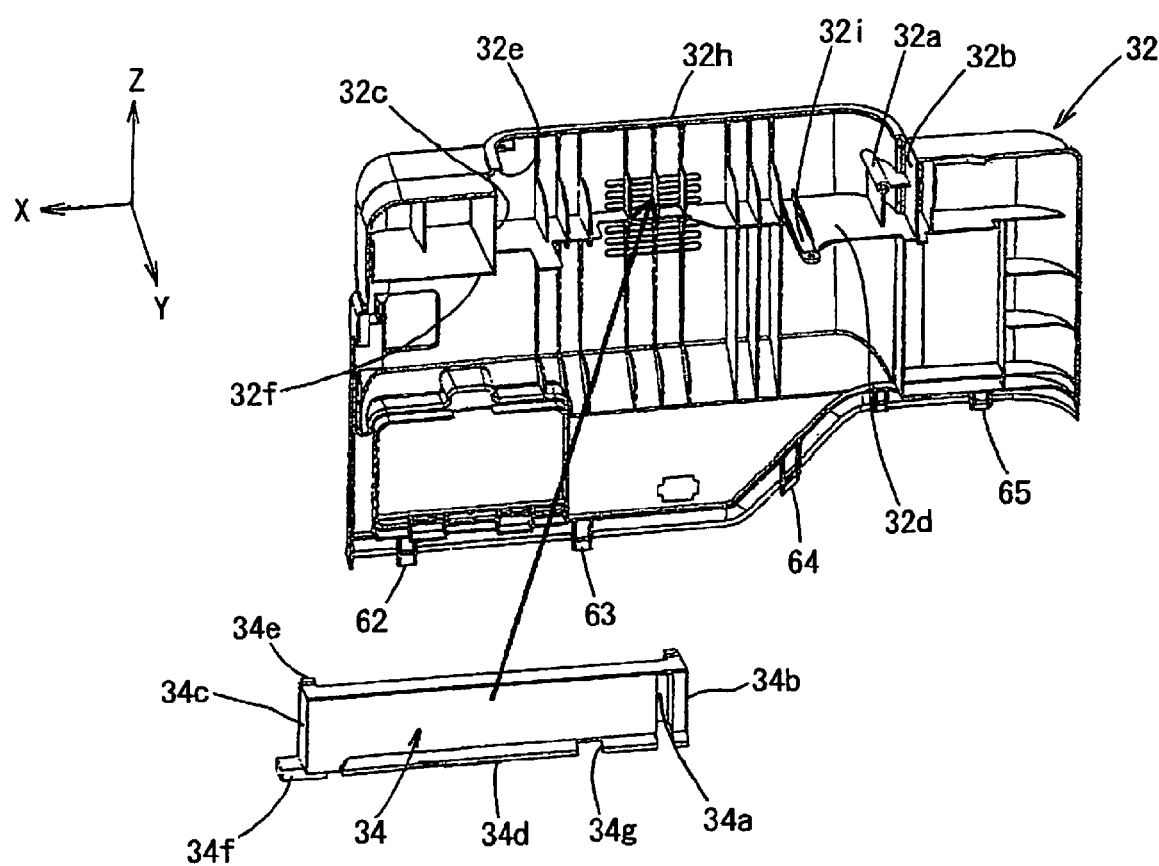
FIG. 10 is an explanatory view for explaining an attachment position of the right cover with respect to a right stay cover according to the first embodiment.
Figure 11:
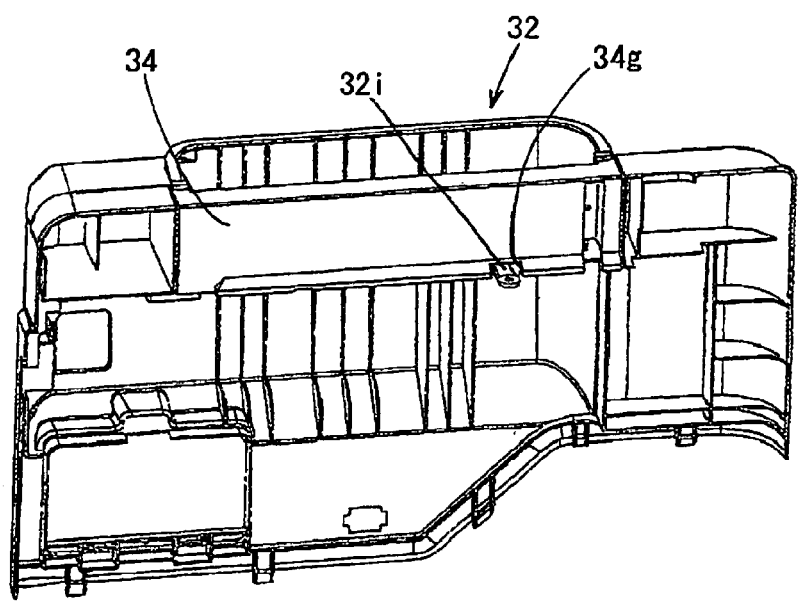
FIG. 11 is an explanatory view illustrating the attachment position of the right cover with respect to the right stay cover according to the first embodiment.

FIGS. 10 and 11 are explanatory views illustrating the attachment positional relationship between right cover 32 and right stay cover 34, as seen from inside of image formation apparatus 1 (as seen from the positive side of the Y-axis). Note that, for descriptive purposes, FIGS. 10 and 11 illustrate right stay cover 34 alone without right scanner stay 36 and printer 3 which are integrally provided with right stay cover 34. In FIGS. 10 and 11, even though it looks like right stay cover 34 is attached to right cover 32, right cover 32 is attached to right stay cover 34 since right stay cover 34 is fixed to right scanner stay 36 (FIG. 7) as described above.

As shown in FIG. 10, the inside of right cover 32 (that is, a side of right cover 32 facing right stay cover 34) is formed with post 32a for a screw and positioning parts 32b, 32c, 32d, and 32e to position right stay cover 34 in left-and-right, up-and-down, and front-and-rear directions. The lower end of right cover 32 is formed with engagement projections 62 to 65. Engagement projections 62 to 65 are to be engaged with right lower cover 61, serving as a first exterior cover, of printer 3 (FIG. 7) as described later.

On the other hand, right stay cover 34 is formed with side face 34b, side face 34c, bottom face 34d, and rear end part 34e. In the state where right stay cover 34 is attached to right cover 32, side face 34b and side face 34c are in contact respectively with positioning parts 32b and 32c of right cover 32 whereas bottom face 34d and rear end part 34e are in contact respectively with positioning parts 32d and 32e of right cover 32. Right stay cover 34 is also formed with threaded hole 34a facing post 32a of right cover 32 and with regulation projection 34f to be engaged with positioning part 32f of right cover 32 thereby regulating movement of right cover 32.

The attachment of right cover 32 to right stay cover 34 is executed as below. As shown in FIG. 7, first, as right cover 32 is moved closer to right stay cover 34. Right cover 32 is positioned such that engagement projections 62 to 65 (FIG. 10) formed at the lower end of right cover 32 is inserted into the inside of right lower cover 61 of printer 3 so as to prevent the lower end of right cover 32 from moving outwardly.

Note that the lower side of right cover 32 has a shape corresponding to and fitting to the upper side of right lower cover 61 of printer 3. The outline of right cover 32 and the height from contact surfaces of engagement projections 62 to 65 to the outside surface of right cover 32 are designed so as to flush the outside surface of right cover 32 with the outside surface of right lower cover 61 and so as not to form a gap between the lower side of right cover 32 and the upper side of right lower cover 61, in the state where right cover 32 is positioned as described above.

Next, right cover 32 is moved so that positioning part 32b, 32c, 32d, and 32e of right cover 32 come respectively in contact with side face 34b, side face 34c, bottom face 34d, and rear end part 34e of right stay cover 34 and so that regulation projection 34f becomes engaged with positioning part 32f. Thereby right cover 32 is prevented from moving with respect to right stay cover 34, as shown in FIG. 11. Next, a screw (not shown) is screwed to post 32a through threaded hole 34a, thereby right cover 32 is fixed to right stay cover 34. This screwing step may be executed from the inside while printer cover unit 121 of printer 3 is opened as shown in FIG. 6, if needed.

Note that, upper side 32h of right cover 32 has a U-shape or a C-shape such that upper side 32h of right cover 32 corresponds to and fits to the outside surface of right downward extension 77a of exterior cover 77 for base block 170. The outlines of covers 32 and 77, the depth of step 77b of exterior cover 77, and the thickness of upper side 32h of right cover 32 are designed so as to flush the outside surface of right cover 31 with the outside surface of exterior cover 77 (see FIG. 2) of right arm section 170c of base block 170 and so as not to form a gap between upper side 32h of right cover 32 and step 77b of exterior cover 77, in the state where the inside of right cover 32 is in contact with the outside of right downward extension 77a and right cover 32 is fixed to right stay cover 34.

Figure 12:
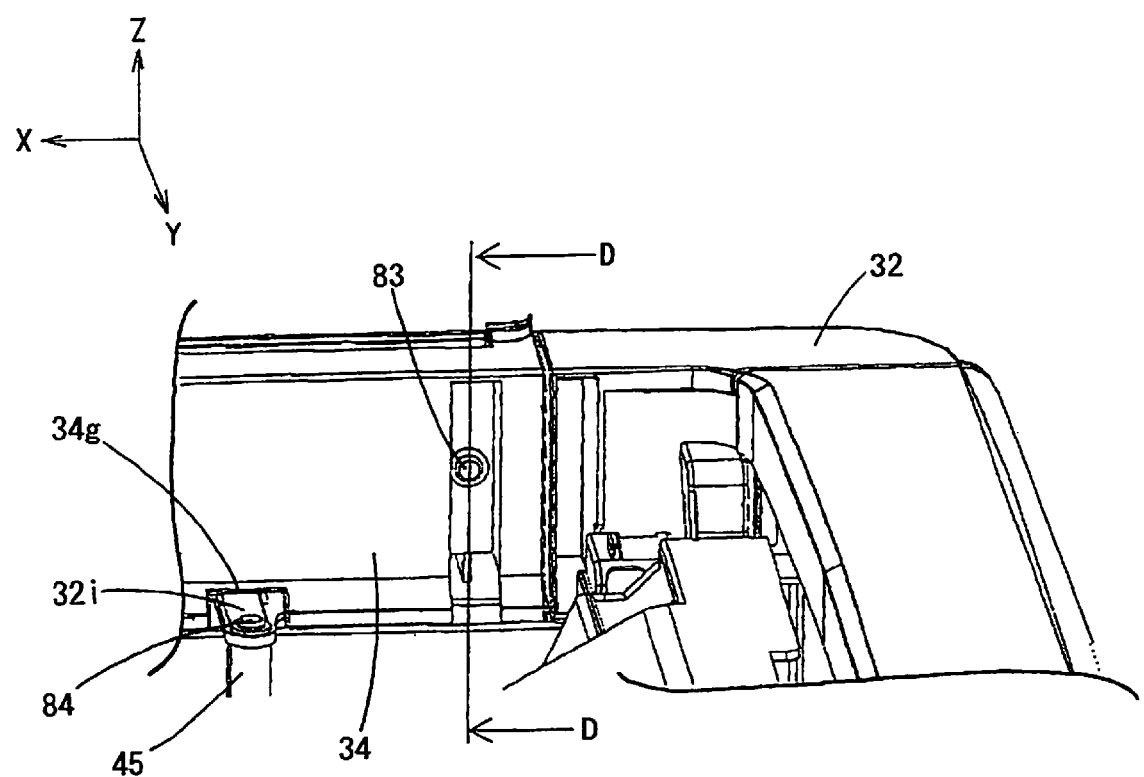
FIG. 12 is a partial enlarged perspective view illustrating the vicinity of a screw connection point in the state wherein the right cover is attached to the right stay cover, as seen from an upper inside position, according to the first embodiment.
Figure 13:
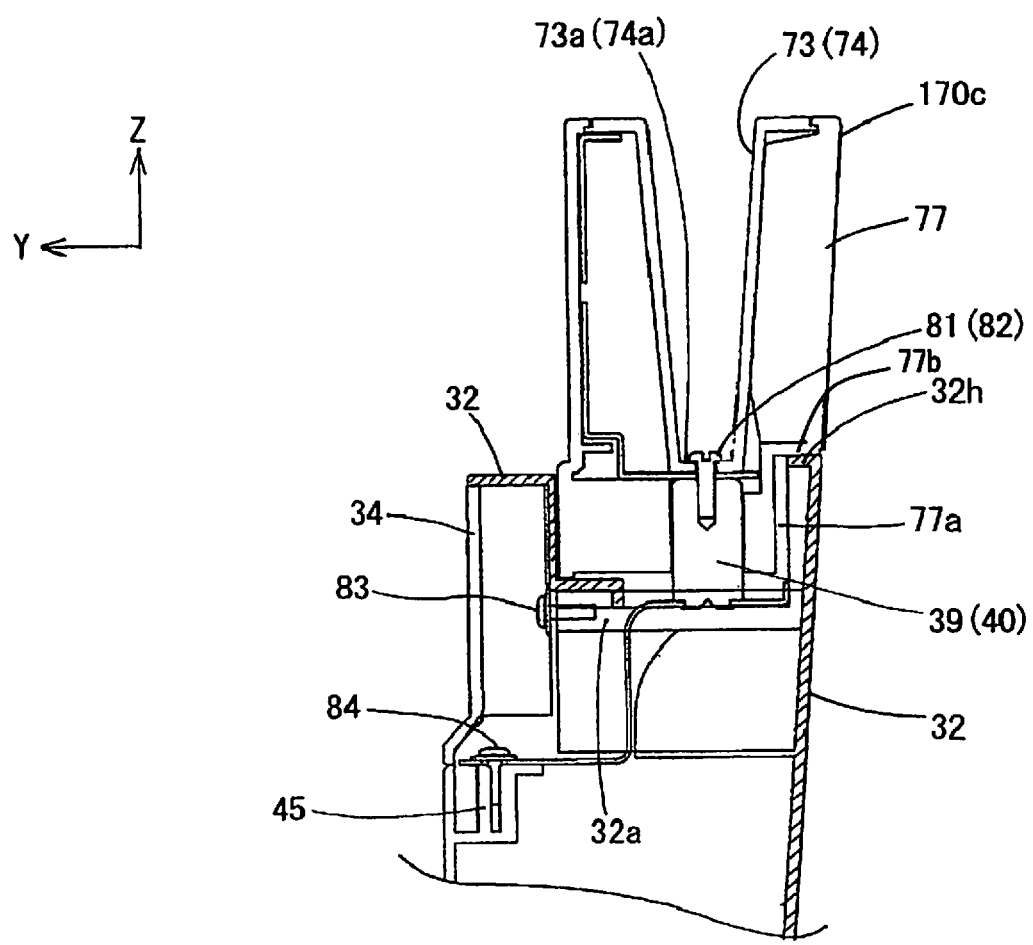
FIG. 13 is a transparent view of a vicinity of an exterior cover, as seen from line D-D passing through the screw connection point along the direction of arrow D in FIG. 12.

FIG. 12 is a partial enlarged perspective view illustrating the vicinity of screw connection point in the state wherein right cover 32 is attached to right stay cover 34, as seen from an upper inside position. That is, FIG. 12 is the view of a part that is encircled in FIG. 6, as seen in the direction of arrow C in FIG. 6. FIG. 13 is a transparent view of the vicinity of step 77b, as seen from line D-D passing the screw connection point in FIG. 12 along the direction of arrow D (toward the positive side of the X-axis). Note that FIG. 12 does not illustrate right arm section 170c of base block 170 and printer cover unit 121 of printer 3.

As shown in FIG. 12, in the state where right cover 32 is attached to right stay cover 34, fixation projection 32i of right cover 32 extends through notch 34g of right stay cover 34 into inside of printer 3. Fixation projection 32i of right cover 32 is directly screwed to post 45 upwardly extending from the chassis of printer 3.

In FIG. 13, screws 81 to 84 are illustrated. Screws 81 and 82 functions to threadedly fix right arm section 170c of base block 170 to right scanner stay 36 (FIG. 7). Screw 83 functions to threadedly fix right cover 32 to right stay cover 34. Screw 84 functions to directly threadedly fix right cover 32 to post 45 of the chassis of printer 3. As described above, screws 81 and 82 are respectively screwed to posts 39 and 40 formed at right scanner stay 36 via engagement hole 73 and engagement elongate hole 74 of right arm section 170c. Screw 83 is screwed to post 32a of right cover 32 via threaded hole 34a (FIG. 10) of right stay cover 34. Screw 84 is screwed to post 45 of the chassis via a threaded hole formed at fixation projection 32i (FIG. 10) of right cover 32.

The screw connection point between right arm section 170c of base block 170 and right scanner stay 36, and the screw connection point between right cover 32 and right stay cover 34 have been described. Left arm section 170b of base block 170, left scanner stay 35, left cover 31, and left stay cover 33 are screwed in the same or similar way.

As described above, according to image formation apparatus 1 of the first embodiment, exterior covers 76 and 77 for scanner 2 is formed with the cover main bodies and downward extensions 76a and 77a extending from the cover main body via steps 76b and 77b, and covers 31 and 32 are directly or indirectly fixed to scanner 2 or printer 3 such that covers 31 and 32 are overlapped with and in contact with downward extensions 76a and 77a of exterior covers 76 and 77. Thus, each downward extension 76a, 77a eliminates a gap between cover 31, 32 and exterior cover 76, 77.

According to image formation apparatus 1 of the first embodiment, each cover 31, 32 is screwed to printer 2 (namely, to stay cover 33, 34 provided integrally with printer 2) from the inside of cover 31, 32 using post 31a, 32a provided at the inside of cover 31, 32. Therefore, the appearance of image formation apparatus 1 is improved since the screw connection point is not seen from the outside of the apparatus 1.

According to image formation apparatus 1 of the first embodiment, the depth of step 76b, 77b of exterior cover 76, 77 is substantially the same as the thickness of the upper side of cover 31, 32. This flushes the outside surface of cover 31, 32 with the outside surface of exterior cover 76, 77 for scanner 2. Therefore, the appearance of image formation apparatus 1 is improved.

Second Embodiment

Figure 14:
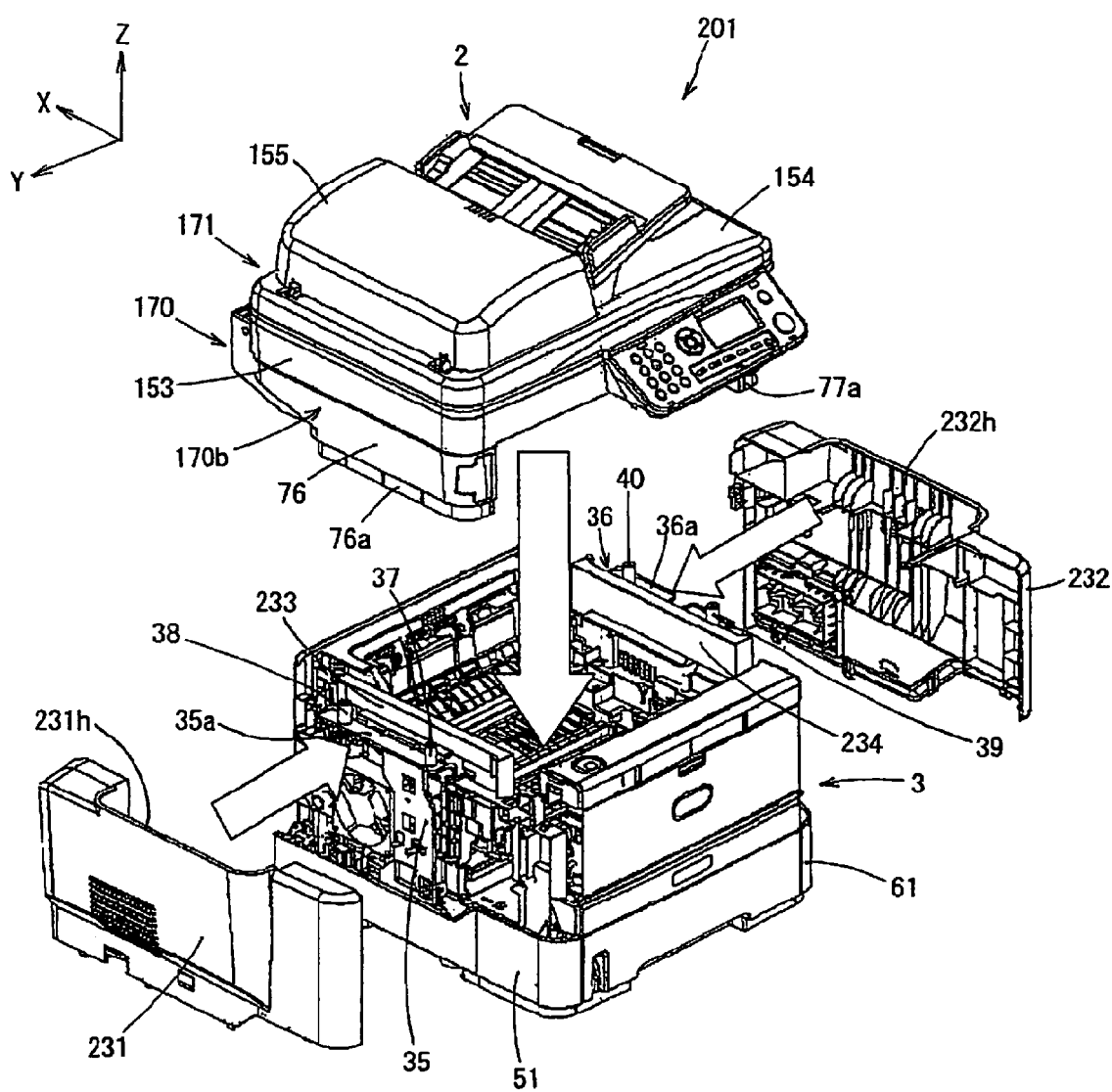
FIG. 14 is an exploded perspective view illustrating an image formation apparatus of a second embodiment in the state wherein a printer, a scanner, a left cover, and a right cover are separated from each other.

FIG. 14 is a exploded perspective view illustrating an image formation apparatus of a second embodiment in the state wherein printer 3, scanner 2, left cover 231, and right cover 232 are separated from each other. Note that printer cover unit 121 is omitted in FIG. 14.

A difference between image formation apparatus 201 of the second embodiment and image formation apparatus 1 of the first embodiment shown in FIG. 1 is the attachment structure of covers 231 and 232 to stay covers 233 and 234 in the second embodiment. In image formation apparatus 201 of the second embodiment, the same components as those in image formation apparatus 1 of the first embodiment shown in FIG. 1 are designated by the same reference numerals or will be explained without illustrations to omit duplicate explanation as to these components, as the different points will be mainly explained.

Note that the following description will partially refer to FIGS. 1 to 6 as needed, since the configuration of image formation apparatus 201 of the second embodiment is the same as those of image formation apparatus 1 of the first embodiment shown in FIGS. 1 to 6, except for the different points.

Upon building image formation apparatus 201 by assembling the separated components thereof as shown in FIG. 14, first, scanner 2 is attached to printer 3. The description of the attachment process is omitted, since the attachment process is the same as that in the first embodiment.

Next, the attachment process of left cover 231 and right cover 232 that are separated as shown in FIG. 14 will be described.

Figure 15:
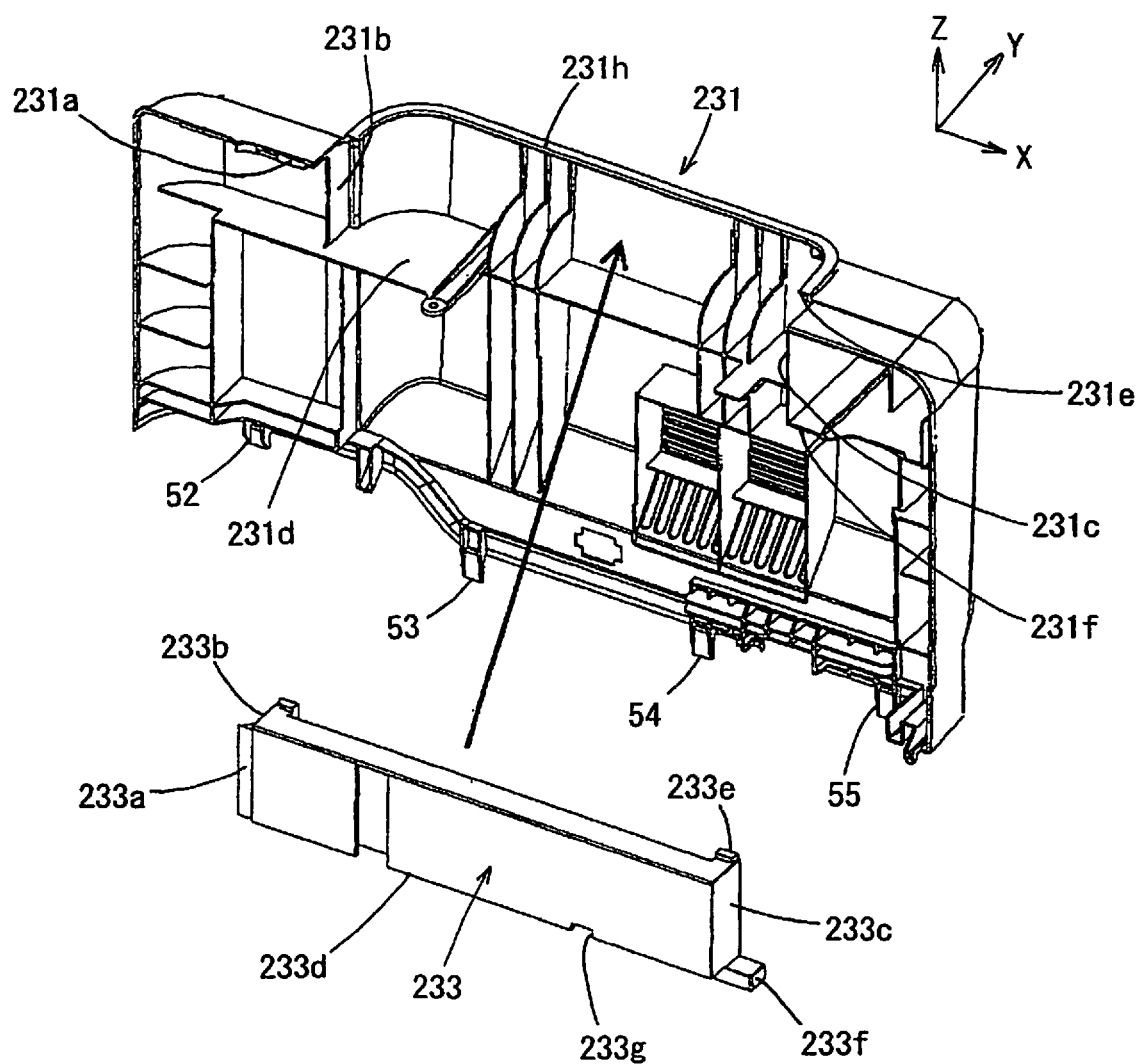
FIG. 15 is an explanatory view for explaining an attachment positional relationship between a left cover and a left stay cover according to the second embodiment.
Figure 16:
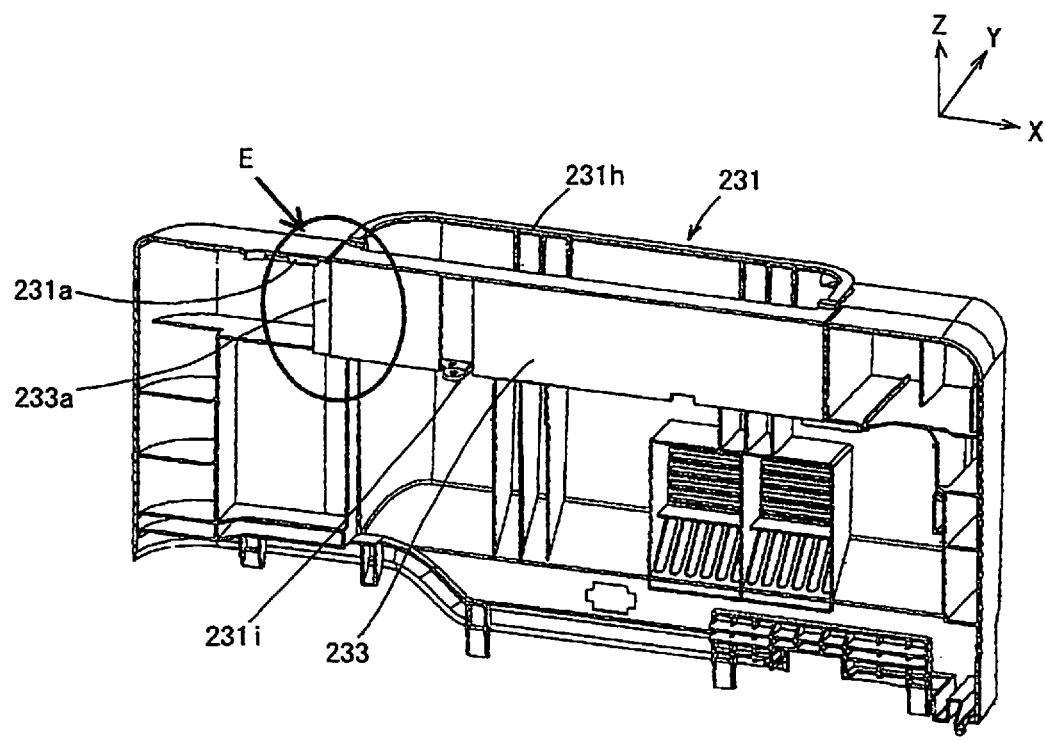
FIG. 16A is an explanatory view illustrating the attachment positional relationship between the left cover and the left stay cover according to the second embodiment.
FIG. 16B is a partial enlarged view of FIG. 16A.
Figure 16:
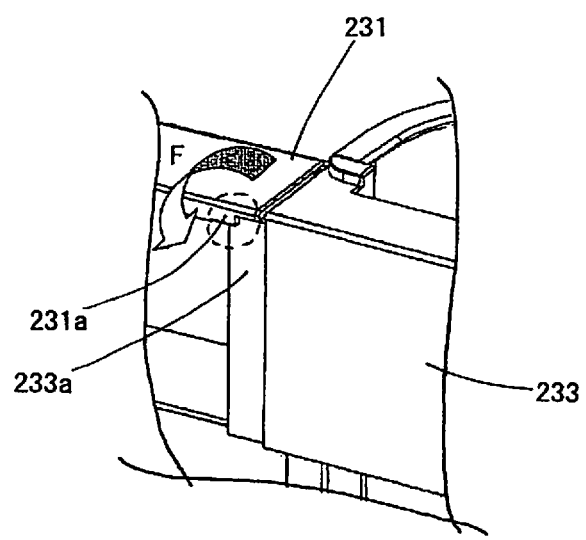

FIGS. 15 and 16 are explanatory views illustrating the attachment positional relationship between left cover 231 and left stay cover 233, as seen from the inside of image formation apparatus 201 (from the negative side of the Y-axis). Note that, for descriptive purposes, FIGS. 15 and 16 illustrate left stay cover 233 without left scanner stay 35 and the printer, which are provided integrally with left stay cover 233. Even through it looks like left stay cover 233 is attached to left cover 231 in FIGS. 15 and 16, as is the case in the first embodiment, left cover 231 is attached to left stay cover 233 since left stay cover 233 (33 in the first embodiment) is fixed to left scanner stay 35 (FIG. 14).

As shown in FIG. 15, the inside of left cover 231 (which is, a side of left cover 231 facing left stay cover 233) is formed with latch clew 231a and positioning parts 231b, 231c, 231d, and 231e to position left stay cover 233 in left-and-right, up-and-down, and front-and-rear directions. The lower end of left cover 231 is formed with engagement projections 52 to 55. Engagement projections 52 to 55 are to be engaged with left lower cover 51 (FIG. 14) of printer 3.

On the other hand, left stay cover 233 is formed with side face 233b, side face 233c, bottom face 233d, and rear end part 233e. In the state where left cover 231 is attached to left stay cover 233, side faces 233b and 233c are respectively in contact with positioning parts 231b and 231c of left cover 231. Rear face 233d and rear end part 233e are respectively in contact with positioning parts 231d and 231e of left cover 231. Left stay cover 233 is also formed with projection 233a and regulation projection 233f. In the state where left cover 231 is attached to left stay cover 233, projection 233a is engaged with latch clew 231a of left cover 231 and regulation projection 233f is engaged with positioning part 231f of left cover 231, thereby regulating movement of left cover 231.

The attachment of left cover 231 to left stay cover 233 is executed as below. First, as left cover 231 is moved closer to left stay cover 233 as shown in FIG. 14, left cover 231 is positioned such that engagement projections 52 to 55 (FIG. 15) formed at the lower end of left cover 231 is inserted into inside of left lower cover 51 of printer 3 so as to prevent the lower end of left cover 231 from moving outwardly.

Note that the lower side of left cover 231 has a shape corresponding to and fitting to the upper side of left lower cover 51 of printer 3. The outline of left cover 231 and the depth from the outside surface of left cover 231 to contact surface of engagement projections 52 to 55 of left cover 231 are designed, so as to flash the outside surface of left cover 231 with left lower cover 51 and so as not to form a gap between the lower side of left cover 231 and the upper side of left lower cover 51 in the state where left cover 231 is positioned as describe above.

Next, left cover 231 is moved so that positioning parts 231b, 231c, 231d, and 231e of left cover 231 come respectively in contact with side face 233b, side face 233c, bottom face 233d, and rear end pat 233e of left stay cover 233 and so that regulation projection 233f becomes engaged with positioning part 231f. Thereby left cover 231 is prevented from moving with respect to left stay cover 233 as shown in FIG. 16A. Then, left cover 231 is pushed against left stay cover 233 so that latch clew 231a (a latch part or a locking part) of left cover 231 passes over and is locked by projection 233a (a latch part or a locking part) of left stay cover 233. Thereby left cover 231 is fixedly attached to left stay cover 233.

Note that FIG. 16B is an enlarged view of a part that is encircled in FIG. 16A. As shown in FIG. 16B, when latch clew 231a of left cover 231 slides over projection 233a of left stay cover 233, projection 233a of left stay cover 233 bows (bends) in the direction of arrow F shown in FIG. 16B to allow latch clew 231a to slide over projection 233a.

Upper side 231h of left cover 231 has a U-shape or a C-shape such that upper side 231h corresponds to and fits to the outside surface of downward extension 76a of exterior cover 76 for left arm section 170b of base block 170. The outlines of covers 231 and 76, the depth of step 76b of exterior cover 76, and the thickness of upper side 231h of left cover 231 are designed so as to flash the outside surface of left cover 231 with the outside surface of exterior cover 76 and so as not to form a gap between upper side 231h of left cover 231 and step 76b of exterior cover 76 in the state where the inside of left cover 231 is in contact with the outside surface of left downward extension 76a and left cover 231 is fixed to left stay cover 233.

Figure 17:
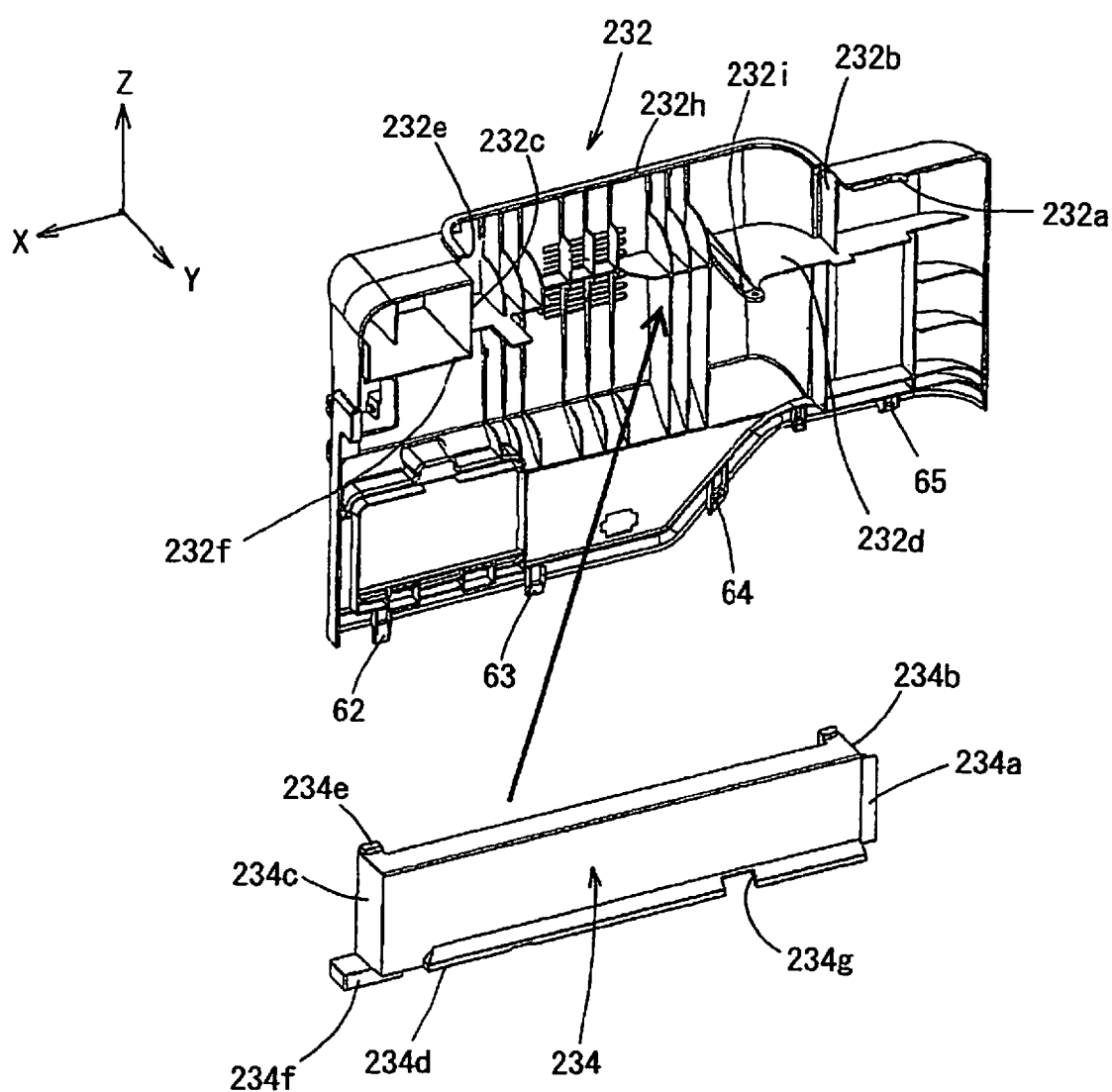
FIG. 17 is an explanatory view for explaining an attachment positional relationship between a right cover and a right stay cover according to the second embodiment.
Figure 18:
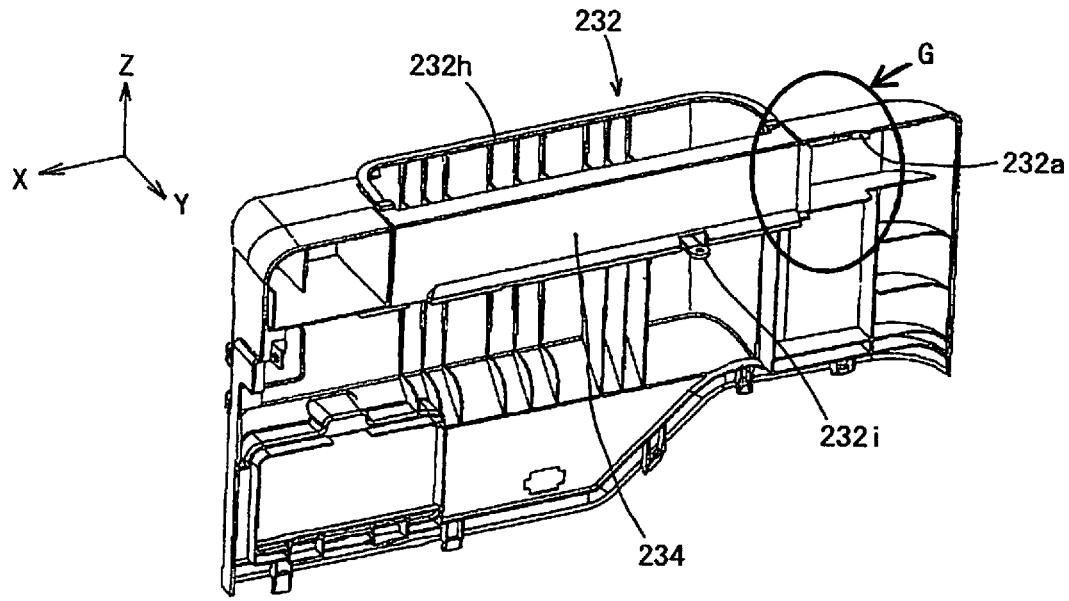
FIG. 18A is an explanatory view illustrating the attachment positional relationship between the right cover and the right stay cover according to the second embodiment.
FIG. 18B is a partial enlarged view of FIG. 18A.
Figure 18:
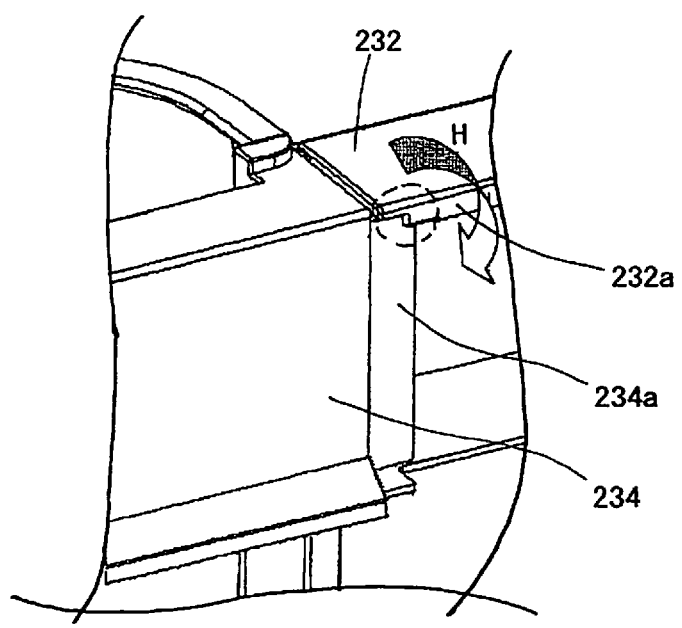

FIGS. 17 and 18 are explanatory views of an attachment position of right cover 232 with respect to right stay cover 234, as seen from the inside of image formation apparatus 201 (as seen from the positive side of the Y-axis). Note that, for descriptive purposes, FIGS. 17 and 18 illustrate right stay cover 234 without right scanner stay 234 and printer 3 which are provided integrally with right stay cover 234. Even though it looks like right stay cover 234 is attached to right cover 232 in FIGS. 17 and 18, right cover 232 is attached to right stay cover 234 since right stay cover 234 (34 in the first embodiment) is fixed to right scanner stay 36 (FIG. 14), like the first embodiment.

As shown in FIG. 17, the inside of right cover 232 (which is, a side of right cover 232 facing right stay cover 234) is formed with latch claw 232a and positioning part 232b, 232c, 232d, and 232e to position right stay cover 234 in left-and-right, up-and-down, and front-and-rear directions. The lower end of right cover 232 is formed with engagement projections 62 to 65 which are to be engaged with right lower cover 61 (FIG. 14) of printer 3.

On the other hand, right stay cover 234 is formed with side face 234b, side face 234c, bottom face 234d, and rear end part 234e. In the state where right cover 232 is attached to right stay cover 234, side faces 234b and 234c are in contact with positioning parts 232b and 232c of right cover 232, respectively, while bottom face 234d and rear end part 234e are in contact with positioning parts 232d and 232e of right cover 232, respectively. Right stay cover 232 is also formed with projection 234a and regulation projection 234f. In the state where right cover 232 is attached to right stay cover 234, projection 234a is engaged with latch claw 232a of right cover 232 and regulation projection 234f is engaged with positioning part 232f of right cover 232, thereby preventing movement of right cover 232.

The attachment of right cover 232 to right stay cover 234 is executed as below. First, as right cover 232 is moved toward right stay cover 234 as shown in FIG. 14, right cover 232 is positioned such that engagement projections 62 to 65 (FIG. 17) formed at the lower end of right cover 232 is inserted into inside of right lower cover 61 of printer 3 so as to prevent the lower end of right cover 232 from moving outwardly.

Note that the lower side of right cover 232 has a shape corresponding to and fitting to the upper side of right lower cover 61 of printer 3. The outline of right cover 232 and the depth from contact of engagement projections 62 to 65 to the outside surface of right cover 232 are designed, so as to flash the outside surface of right cover 232 with the outside surface of right lower cover 61 and so as not to form a gap between the lower side of right cover 232 and the upper side of right lower cover 61 in the state where right cover 232 is positioned as described above.

Next, right cover 232 is moved so that positioning parts 232b, 232c, 232d, 232e of right cover 232 come in contact respectively with side face 234b, side face 234c, bottom face 234d, rear end part 234e of right stay cover 234 and so that regulation projection 234f becomes in contact with positioning part 232f. Thereby right cover 232 is prevented from moving with respect to right stay cover 234 as shown in FIG. 18A. Then, right cover 232 is pushed against right stay cover 234 so that latch claw 232a of right cover 232 passes over projection 234a of right stay cover 234 and is locked by projection 234a, thereby right cover 232 is fixed to right stay cover 234.

Note that FIG. 18B is an enlarged view of a part that is encircled in FIG. 18A. As shown in FIG. 18B, when latch claw 232a of right cover 232 slides over projection 234a of right stay cover 234, projection 234a of right stay cover 234 bows (bends) in the direction of arrow H shown in FIG. 18B to allow latch claw 232a to slide over projection 234a.

Upper side 232h of right cover 232 has a U-shape or a C-shape such that upper side 232h corresponds to and fits to the outside surface of downward extension 77a of exterior cover 77 (not shown) for right arm section 170c of base block 170. The outlines of covers 232 and 77, the depth of step 77b of exterior cover 77, and the thickness of upper side 232h of right cover 232 are designed so as to flash the outside surface of right cover 232 with the outside surface of exterior cover 77 and so as not to form a gap between upper side 232h of right cover 232 and step 77b of exterior cover 77 in the state where the inside of right cover 232 is in contact with the outside of right downward extension 77a and right cover 232 is fixed to right stay cover 234.

Figure 19:
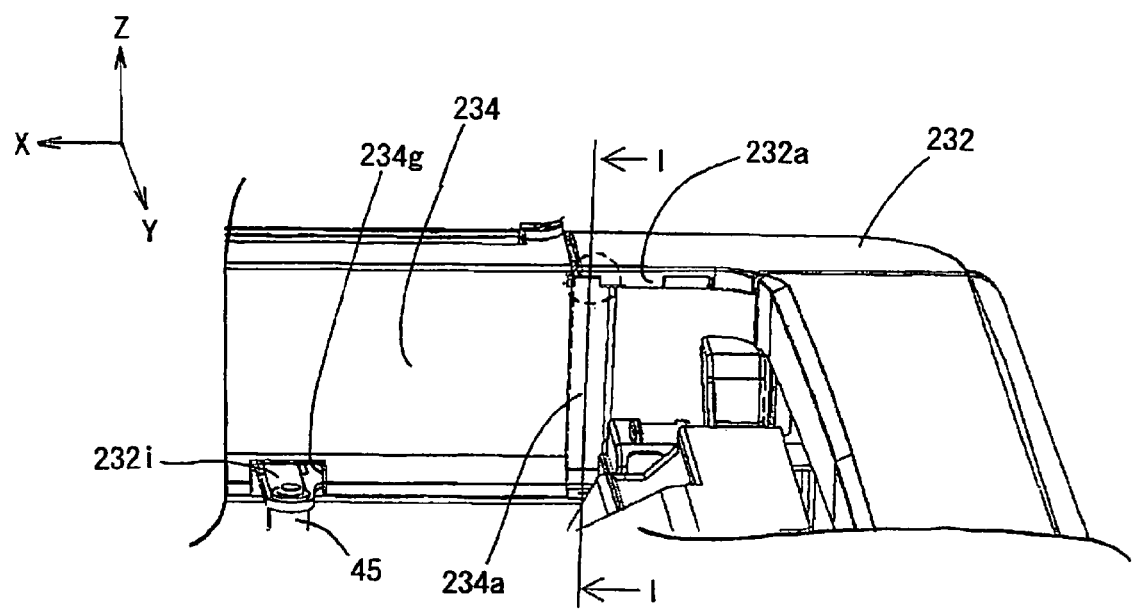
FIG. 19 is a partial enlarged perspective view of the vicinity of a latch point having a latch claw and a projection as seen from an upper inside position in the state wherein the right cover is attached to the right stay cover according to the second embodiment.
Figure 20:
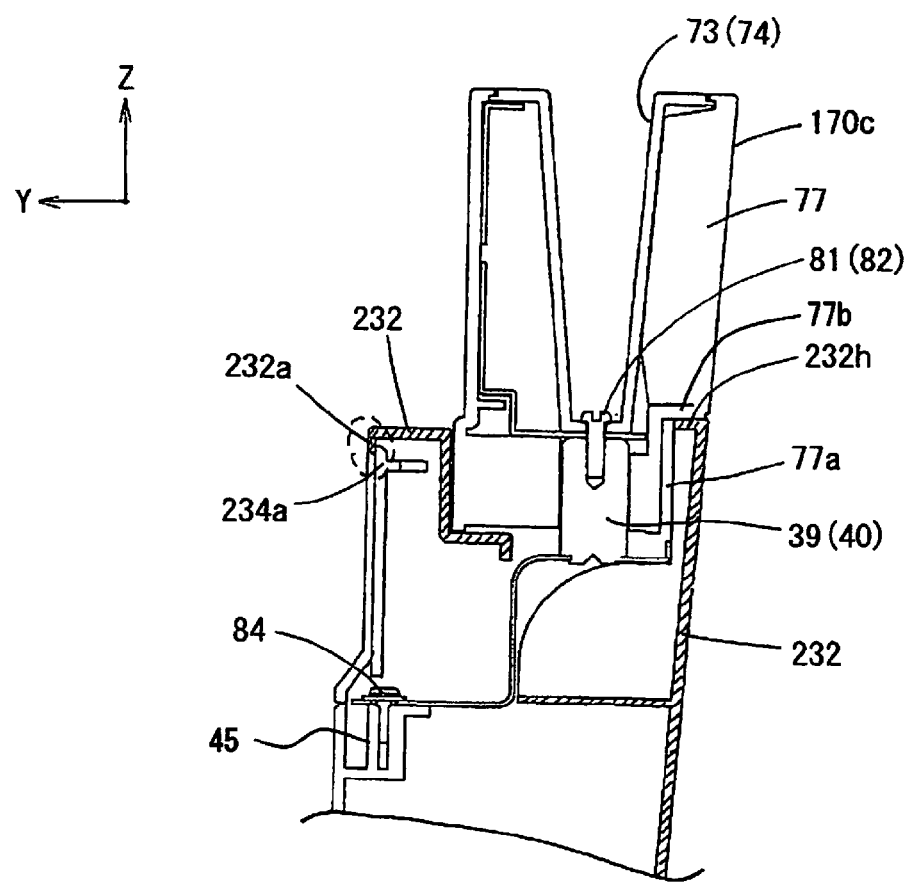
FIG. 20 is a transparent view of the vicinity of a step of an exterior cover, as seen from line I-I passing through the latch point along the direction of arrow I in FIG. 19.

FIG. 19 is a partial enlarged perspective view of the vicinity of the latch point (locking point) having latch claw 232a and projection 234a as seen from an upper inside position in the state where the right cover 232 is attached to right stay cover 234. FIG. 20 is a transparent view of the vicinity of step 77b of exterior cover 77, as seen from line I-I passing through the latch point along the direction of arrow I (the negative direction of the X-axis) in FIG. 19. Note that right arm section 170c of base block 170 and printer cover unit 121 of printer 3 are omitted in FIG. 19.

As shown in FIG. 19, in the state where right cover 232 is attached to right stay cover 234, fixation projection 232i of right cover 232 extends through notch 234g of right stay cover 234 into inside of printer 3. Fixation projection 232i is directly screwed to post 45 upwardly extending from the chassis of printer 3.

In FIG. 20, right arm section 170c of base block 170 is fixed to posts 39 and 40 of right scanner stay 36 (FIG. 14) by screws 81 and 82, right cover 32 is screwed to post 45 of the chassis of printer 3 by screw 84, and latch claw 232a of right cover 232 is locked (latched) by projection 234a of right stay cover 234 after latch claw 232a has passed over projection 234a.

The structure between left arm section 170b of base block 170 and left scanner stay 35 and the structure between left cover 231 and left stay cover 233 are the same as the screw connection point between right arm section 170c of base block 170 and right scanner stay 36 and the latch point between right cover 232 and right stay cover 234 which have been described above.

As described above, according to image formation apparatus 201 of the embodiment, latch clews 231a, 232a of covers 231, 232 and projections 233a, 234a of stay covers 233, 234 are latched together after latch clews 231a, 232a have been passed over projections 233a, 234a. With this latch structure (or with this locking structure), the second embodiment does not need screw 83 used in the first embodiment. That is, the second embodiment simplifies the attachment process of covers 231 and 232, in addition to the effect of the first embodiment.

Note that even through the above embodiments have lower covers 51 and 61 for printer 3, the invention is not limited to this but includes various applications and modifications. For example, an embodiment may lack lower covers 51 and 61 and may have covers 31 and 32 which extend to areas corresponding to lower covers 51 and 61.

Even through the above embodiments describe the image forming apparatuses including the printer and the scanner; however, the invention can be applied to not only this and may be applied to an image formation apparatus of other type such as facsimile machine, MFP (Multifunction Peripheral), or the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image formation apparatus, comprising:
a first unit and a second unit connected with each other;
a first exterior cover covering a part of the first unit;
a second exterior cover covering a part of the second unit and formed with a cover main body and an extension extending from the cover main body; and
a third exterior cover provided between the first exterior cover and the second exterior cover, overlapping with and in contact with the extension of the second exterior cover,
wherein the third exterior cover is formed with engagement projections suitable for engaging the inside of the first exterior cover.

2. The image formation apparatus of claim 1, wherein the first unit is a printer and the second unit is a scanner.

3. The image formation apparatus of claim 1, wherein a step is provided between an outside surface of the extension and an outside surface of the cover main body of the second exterior cover, the depth of the step is substantially equal to the maximum thickness of a portion of the third exterior cover that overlaps the extension of the second exterior cover.

4. An image formation apparatus, comprising:
a first unit and a second unit connected with each other;
a first exterior cover covering a part of the first unit;
a second exterior cover covering a part of the second unit and formed with a cover main body and an extension extending from the cover main body; and
a third exterior cover provided between the first exterior cover and the second exterior cover, overlapping with and in contact with the extension of the second exterior cover,
wherein the third exterior cover is fixed to a support member that is fixed to the first unit.

5. The image formation apparatus of claim 4, wherein the third exterior cover is formed with a post at the inside of the third exterior cover, and the third exterior cover is screwed to the support member with the post.

6. The image formation apparatus of claim 4, wherein the third exterior cover is formed with a first latch part, and the support member is formed with a second latch part to be locked by the first latch part.

7. The image formation apparatus of claim 4, wherein the support member is configured as an interior cover of the first unit.

8. An image formation apparatus, comprising:
a first exterior cover covering a first part of the image formation apparatus;
a second exterior cover covering a second part of the image formation apparatus, which is different from the first part, and formed with a cover main body and an extension extending from the cover main body; and
a third exterior cover provided between the first exterior cover and the second exterior cover, overlapping with and in contact with the extension of the second exterior cover,
wherein the third exterior cover is formed with engagement projections suitable for engaging the inside of the first exterior cover.

9. The image formation apparatus of claim 8, wherein the third exterior cover is fixed to a support member that is fixed to the image formation apparatus.

10. The image formation apparatus of claim 9, wherein the second exterior cover is formed with a latch member on an interior surface thereof, and wherein the second exterior cover is attached to the image formation apparatus by latching the latch member onto a component provided within the image formation apparatus.

11. The image formation apparatus of claim 10, wherein a step is provided between an outside surface of the extension and an outside surface of the cover main body of the second exterior cover, the depth of the step is substantially equal to the maximum thickness of a portion of the third exterior cover that overlaps the extension of the second exterior cover.

12. An image formation apparatus, comprising:
a first exterior cover covering a first part of the image formation apparatus;
a second exterior cover covering a second part of the image formation apparatus, which is different from the first part, and formed with a cover main body and an extension extending from the cover main body;
a third exterior cover provided between the first exterior cover and the second exterior cover, overlapping with and in contact with the extension of the second exterior cover; and
a support member fixed to the image formation apparatus, wherein the third exterior cover is fixed to the support member.

13. The image formation apparatus of claim 12, wherein the third exterior cover is formed with engagement portions suitable for engaging with the inside of the first exterior cover.

14. The image formation apparatus of claim 13, wherein the second exterior cover is formed with a latch member on an interior surface thereof, and wherein the second exterior cover is attached to the image formation apparatus by latching the latch member onto a component provided within the image formation apparatus.

15. The image formation apparatus of claim 14, wherein a step is provided between an outside surface of the extension and an outside surface of the cover main body of the second exterior cover, the depth of the step is substantially equal to the maximum thickness of a portion of the third exterior cover that overlaps the extension of the second exterior cover.

* * * * *